A. N. DAVIS.
NUT LOCK.
APPLICATION FILED OCT. 23, 1912.

1,085,247.

Patented Jan. 27, 1914.

Attest:
Wm. H. Scott
Zelma Pinero

Inventor:
Albert N. Davis,
by Ralph Keith
Atty.

UNITED STATES PATENT OFFICE.

ALBERT N. DAVIS, OF ST. LOUIS, MISSOURI, ASSIGNOR OF ONE-HALF TO SPARKS D. HENDERSON, OF ST. LOUIS, MISSOURI.

NUT-LOCK.

1,085,247.

Specification of Letters Patent.

Patented Jan. 27, 1914.

Application filed October 23, 1912. Serial No. 727,287.

*To all whom it may concern:*

Be it known that I, ALBERT N. DAVIS, a citizen of the United States, residing at the city of St. Louis, State of Missouri, have invented a certain new and useful Improvement in Nut-Locks, of which the following is a specification, reference being had to the accompanying drawings, forming a part hereof, in which—

Figure 1:
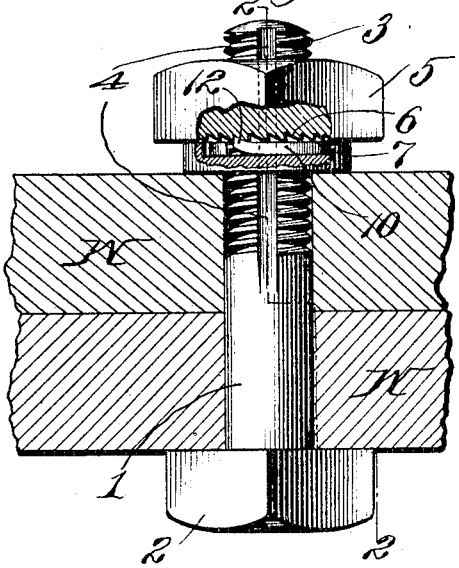
Figure 2:
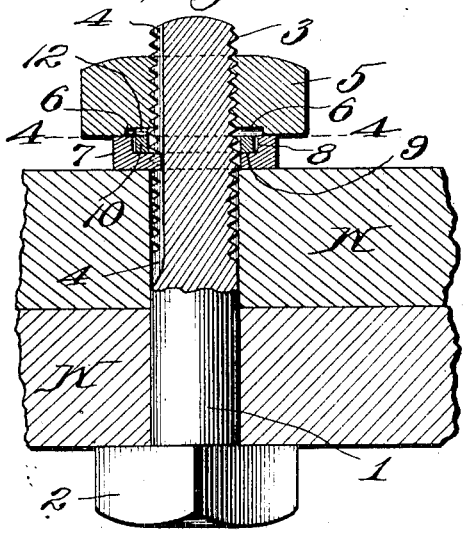
Figure 3:
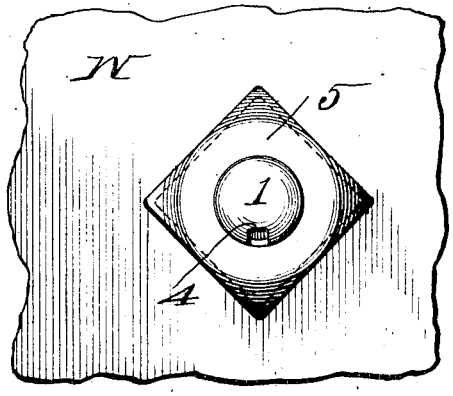
Figure 4:
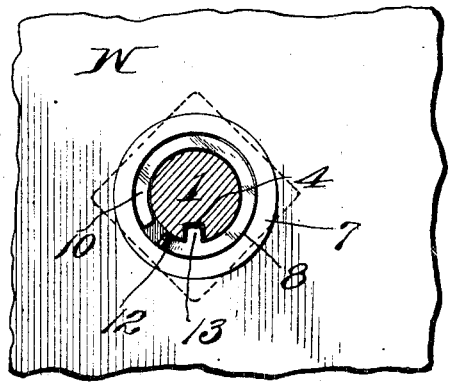
Figure 5:
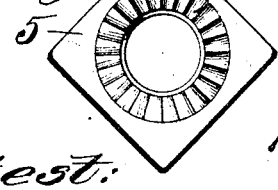
Figure 6:
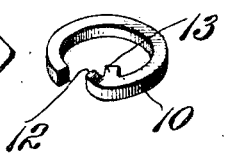
Figure 7:
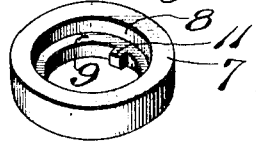

Figure 1 is an elevational view, partly in section, of a bolt and nut embodying my invention; Fig. 2 is a view thereof partly in longitudinal section on the line 2—2, Fig. 1; Fig. 3 is an end view thereof; Fig. 4 is a lateral or cross sectional view on the line 4—4, Fig. 2; Fig. 5 is a plan view of the inner face of the nut comprised in, and forming part of, my invention; Fig. 6 is a perspective view of the split spring ring comprised in, and forming part of, my invention; and Fig. 7 is a perspective view of the washer-member comprised in, and forming part of, my invention, and which is adapted to reinforce said ring and in which said ring is normally seated.

This invention relates to a certain new and useful improvement in nut-locks, the objects of my invention being to provide the bolt and its nut with comparatively simple and inexpensive coöperating locking means whereby, when the nut is screwed or threaded down upon the work, it becomes automatically locked or fixed in work-holding or engaging position and from which position it is practically impossible for said nut to afterward, through jars, shocks, vibrations, or the like, work loose, said nut being only removable from work-engaging position, the bolt and its nut remaining intact and uninjured, by means of a suitable or special tool manipulated to that end, and to improve generally upon devices of the kind stated.

With these objects in view, my invention resides in certain novel features of construction, arrangement, and combination of parts, all as hereinafter described and afterward pointed out in the claim.

Referring by numerals to the accompanying drawings, 1 indicates a suitable bolt provided at one end with a suitable head 2 and threaded at its other end, as at 3, bolt 1 being also provided on its threaded surface or at its threaded end 3, for purposes hereinafter appearing, with a longitudinal groove or elongated recess, as at 4, see particularly Fig. 1.

5 indicates a suitable interiorly threaded nut adapted to fit and thread on the threaded end 3 of bolt 1, this nut 5 being provided on its inner face and around the rim of the threaded opening therein with an under-cut circular series of ratchet teeth or the like, as at 6.

7 indicates a washer-member circularly perforated to fit on and neatly accommodate the body or shank of bolt 1. This washer-member 7 is interiorly cut away, as at 8, to provide an inclosed annular shoulder or seat 9 for a split spring ring or other suitable resilient member 10 adapted to neatly fit on bolt 1 and rest within the cut-away portion 8 of member 7 with its outer face preferably bearing against or resting on, the surface of said seat 9, as shown particularly in Figs. 1 and 2. In operation, washer-member 7 fits and is interposed on bolt 1 between the work W to be engaged and nut 5 with its said cut-away portion 8 presented toward, and the rim thereof impinging directly upon, the inner face of nut 5, said seat portion 9 of washer-member 7 being provided with an inwardly-projecting key or member 11 adapted to slidably fit in said longitudinal groove 4 of bolt 1 and operatively engage with the walls of said groove to prevent washer 7 bodily rotarily moving on, and relatively to, nut 1. As shown particularly in Fig. 6, said split ring 10 at one of its ends is bent slightly sidewise to provide a projecting tooth or dog-member as at 12, adapted, when said ring is in position within washer 7, to project beyond the plane of the outer face of washer 7 and operatively engage with said teeth 6 on nut 5. Ring 10 is also, as shown particularly in Fig. 6, provided preferably adjacent its said bent end 12 with an inwardly-projecting key or portion 13 adapted to likewise slidably fit in said groove 4 and operatively engage with the walls thereof to prevent said ring 10 bodily rotarily moving on, and relatively to, bolt 1. Preferably, as stated, ring 10 is of such width relatively to the depth of cut-away portion 8 of washer 7 that said dog-member or tooth 12, when ring 10 is within washer 7, will project outwardly slightly beyond the outer face of washer 7.

In operation, a bolt 1 having been placed in position or passed through the work W to be engaged, a washer 7 and ring 10 are first positioned and slidably moved on threaded end 3 thereof against work W, the keys 11 and 13 of said washer and ring fitting in and engaging with groove 4, as described. Nut 5 is now threaded on bolt 1 to engage work W, whereupon teeth 6 and 12 will engage and, while the engagement of said teeth will not prevent nut 5 being threaded inwardly upon nut 1 to force washer 7 tightly up against work W, they will positively, firmly, and securely lock nut 5 upon bolt 1 and lock nut 5 so securely or fixedly upon bolt 1 that it is practically impossible for said nut to afterward, through jars, shocks, vibrations, or the like, work loose on bolt 1 from work-engaging position no matter in what particular position said bolt 1 may be placed or hang. Washer 7, while providing a seat for said ring 10, will at the same time, by receiving the strain imparted to ring 10, also tend to reinforce, and prevent the breaking of, or injury to, said ring. To remove ring 10 from bolt 1 without damaging or breaking the parts stated, a suitable or special tool may be inserted endwise in groove 4 and tooth 12 thereby disengaged from teeth 6, when ring 5 may be outwardly threaded or moved on bolt 1 from work engaging position.

I am aware that minor changes in the construction, arrangement, and combination of the several parts of my invention may be made and substituted for those herein shown and described without departing from the nature and principle of my invention.

Having thus described my invention, what I claim and desire to secure by Letters Patent is:

The nut-lock herein described, the same comprising, in combination with a threaded bolt provided on its threaded surface with a longitudinal groove, a threaded nut fitting on said bolt and having an undercut or depressed circular series of teeth on its inner or under face around the rim of the threaded opening therethrough, a washer 7 fitting on said bolt between the under face of said nut and the work to be engaged and having an integral inwardly-extending projection 11 fitting in and engaging with the walls of said groove to hold said washer from rotatorily moving on said bolt, said washer being interiorly cut away at one side around the opening therethrough and thereby provided with an inclosed annular seat 9, the rim of said seat impinging flatwise directly upon, and being entirely covered by, the under face of said nut when said parts are in operative position, and a flat split spring ring-member 10 fitting on said bolt and seated in and inclosed by said washer with its outer face substantially flush with the rim of said seat, said ring-member having a width or thickness approximately the same as the depth of the cut-away portion of said washer and being laterally bent at one end and thereby provided with an integral spring tooth 12 projecting normally beyond the plane of the rim of said seat and being adapted to operatively engage with said undercut or depressed series of teeth to lock said nut on said bolt in work-engaging position, said ring-member being further provided closely adjacent said tooth 12 with an inwardly-extending projection 13 also fitting in and engaging with the walls of said groove to hold said ring from rotatorily moving in said seat and on said bolt, substantially as and for the purpose described.

In testimony whereof, I have signed my name to this specification in the presence of two subscribing witnesses.

ALBERT N. DAVIS.

Witnesses:
RUTH PETERSON,
S. D. HENDERSON.

---

Copies of this patent may be obtained for five cents each, by addressing the "Commissioner of Patents, Washington, D. C."